Jan. 1, 1929.
G. R. FOLDS ET AL
1,697,060
UNDERGROUND POLE CABLE TERMINAL
Filed July 8, 1925     3 Sheets-Sheet 3
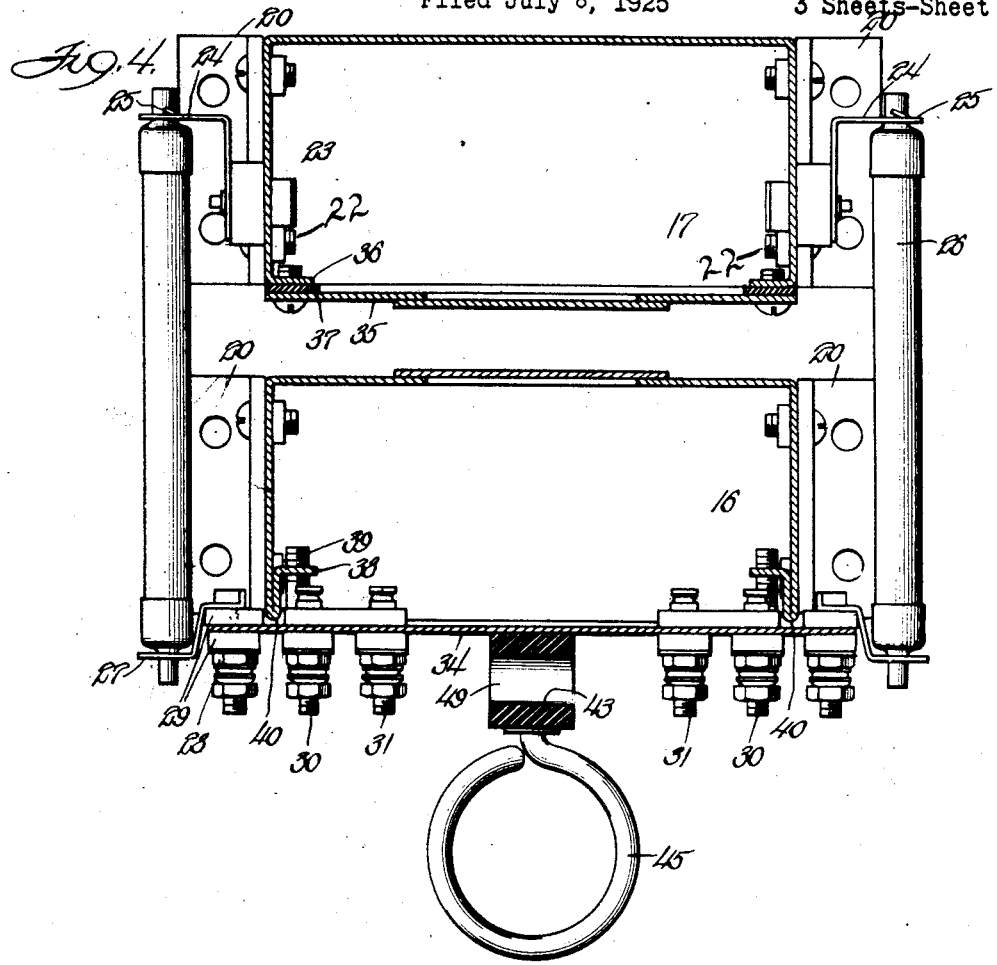
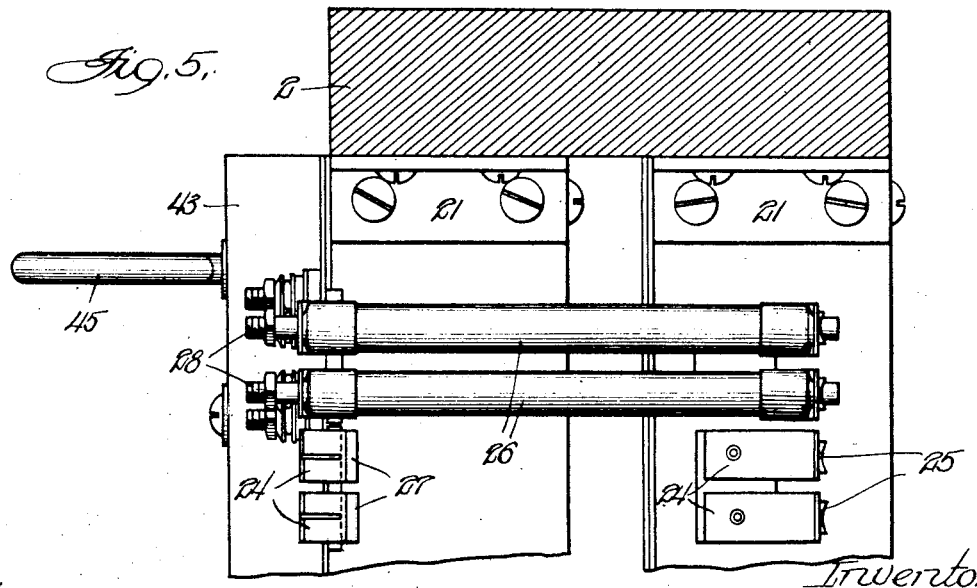
Witness:
W. K. Olson
Inventors:
George R. Folds
Lawrence M. Persons Patented Jan. 1, 1929.

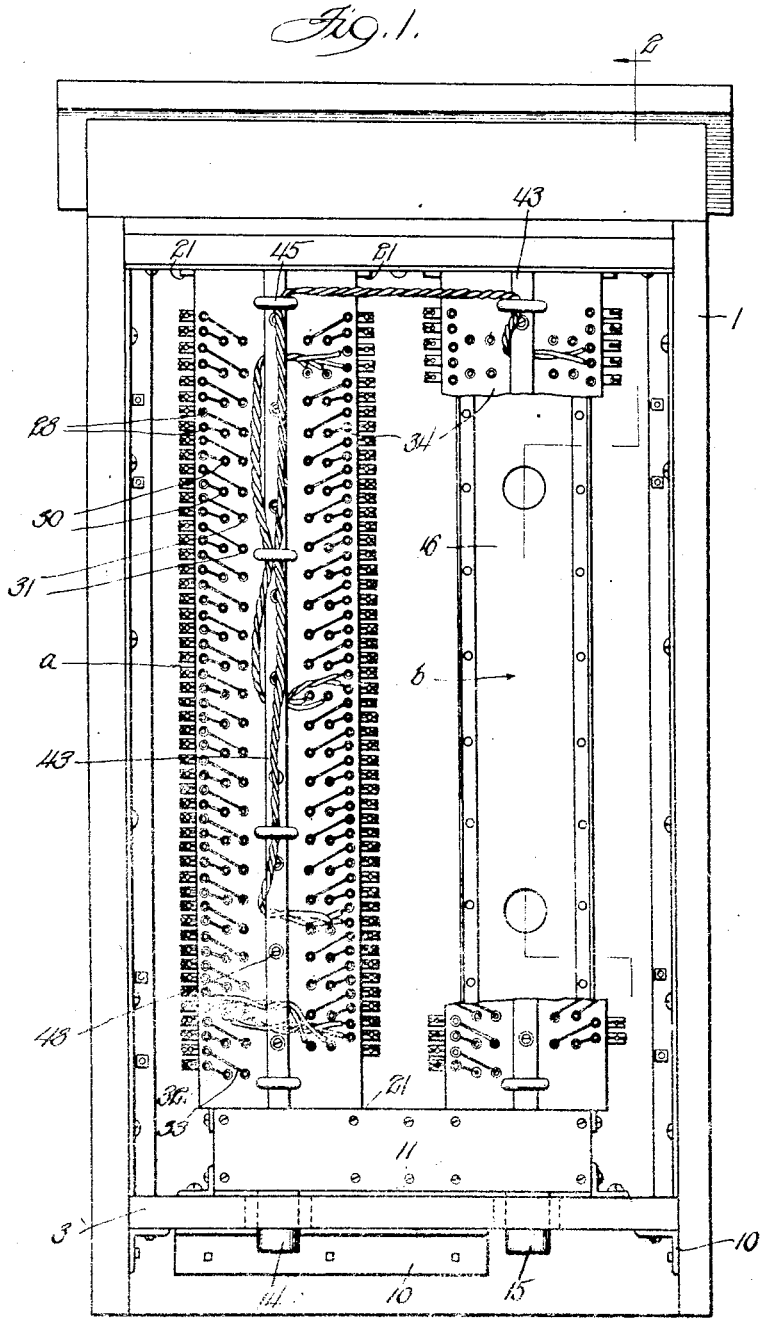

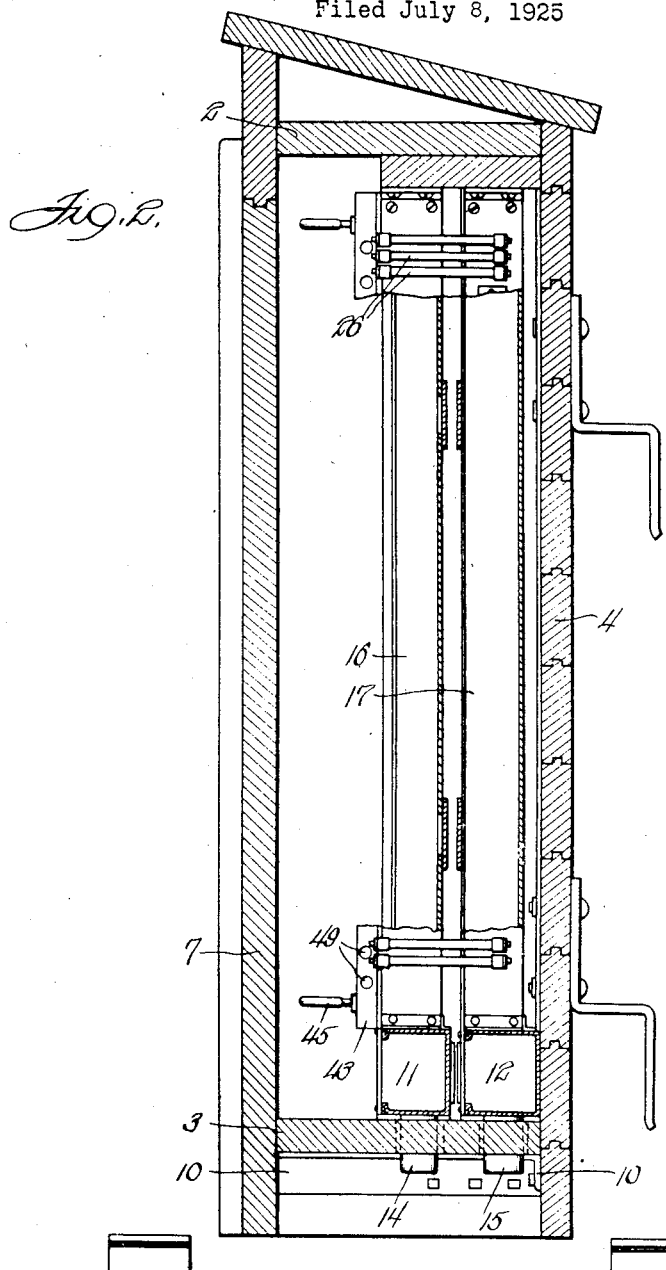

1,697,060

UNITED STATES PATENT OFFICE.

GEORGE R. FOLDS AND LAWRENCE M. PERSONS, OF CHICAGO, ILLINOIS, ASSIGNORS TO COOK ELECTRIC COMPANY, OF CHICAGO, ILLINOIS, A CORPORATION OF ILLINOIS.

UNDERGROUND POLE CABLE TERMINAL.

Application filed July 8, 1925. Serial No. 42,148.

Our invention relates to cable terminals and more particularly to a type of terminal used in connection with telephone, telegraph, or other electrical cables, for the purpose of connecting aerial and underground cables, and for protecting them against injury.

In modern telephone plants, the best practice requires that all telephone cables from the exchanges be placed underground in districts where there are many subscribers. However, in outlying districts, distribution is generally made by aerial cables. This requires that the underground cables be tapped at various points for connection to the aerial cables, and where the underground cables terminate it is preferable to extend them with the aerial cables strung on poles. Where these connections are made, good practice requires a terminal box for the aerial cable and another terminal box for the underground cable. It has been found practical to connect the circuits through fuses as the hazard of exposed aerial cables is much greater than that of underground cables. As the investment of underground cables is greater, every care should be taken to protect them against injury. On the other hand, it has been found that such terminal boxes with cross connection facilities between cables are of great advantage.

Those skilled in the art are aware of the fact that terminal boxes are commonly known. It is cutomary to position them in parallel relation in a pole house, and to protect one of these terminal boxes with fuses, while the other terminal box may be connected thereto, but will be unprotected except through this connection. Such connection is made with jumper wires provided in large numbers across the front of the terminal boxes. It is evident therefore that a mass of intercrossing wires forming a network throughout the pole house must result, particularly where a large number of circuits are cared for by a single pole house.

An object of our invention is to provide a cable terminal having core boxes arranged therein, one in front of the other, which are connected in pairs, the aerial and underground conductors accommodated therein being connected preferably through protective devices compactly arranged at the sides of each pair. As a consequence, the general arrangement within a cable terminal consists of units set parallel to each other with the connections between the aerial and underground conductors forming, in reality, part of these units, thereby eliminating the aforesaid undersirable network of wires which interferes with quick access to the conductors and tends to prevent maximum circuit capacity of the cable terminal.

A further object of our invention resides in the provision of an improved arrangement of binding posts permitting convenient and rapid connection between conductors of the same circuit, and, should it be desired, cross connection between conductors of different circuits by leading the interconnecting wires between binding posts and along the center of the front core box of each unit where a fanning strip retains these wires suitably bunched and easily identified when needed.

Further objects and advantages of our invention will be apparent from the detailed description when taken in connection with the accompanying drawings forming a part hereof.

In the drawings:

Figure 1 is a front elevational view of a cable terminal embodying our invention with the door of the pole house removed;

Fig. 2 is a vertical sectional view taken on line 2—2 of Fig. 1;

Fig. 3 is a cross sectional view through the pole house, this view looking upwardly at the bottom of the wooden floor supporting the core boxes within the pole house;

Fig. 4 is an enlarged cross sectional view through a unit of core boxes to illustrate how they may be mechanically arranged as a unit within the pole house by fuses bridged across the core boxes at their sides; and Fig. 5 is a side elevational view of a portion of one of these units.

The cable terminal illustrated comprises a wooden pole house 1, in which a plurality of core boxes for the aerial conductors and the underground conductors are vertically disposed and preferably arranged in pairs, one in front of the other, so as to form units $a$ and $b$. These units may be arranged in parallel relation between the ceiling 2 and floor 3 of the pole house 1. We find that any convenient type of construction may be used for pole house 1, but in the present instance we prefer to use a wooden structure having a back wall 4 secured to the vertical sides 5 and 6. A front door 7 is provided which may open along the center and be swung outwardly from the front on hinges 8. By referring to Fig. 3, these hinges 8 will be seen as bolted to the sides 5 and 6, the front portion of these sides being connected to the door so that in reality the door opens along a line through these sides. It will be apparent later on in the description that opening the door in this manner affords convenient access to the sides of the core boxes where protective devices may be connected in circuit. A suitable latch 9 may hold the door in closed position at the front of the pole box.

Floor 3 may be secured in place in the bottom of pole house 1 by means of angle irons 10 or other suitable fastening elements. Secured upon floor 3 are a pair of horizontally disposed parallel core boxes 11 and 12. These boxes should preferably be suitably insulated from each other by being properly spaced apart. The aerial cable leading to the cable terminal may be accommodated by a nipple 14 extending through floor 3 and communicating with core box 11. In like manner, the underground cable may be accommodated by a similar nipple 15 extending through floor 3 and communicating with core box 12. These nipples are preferably of the self soldering type which is well understood to those skilled in the art.

Pairs of vertical core boxes 16 and 17 are seated on the horizontal core boxes 11 and 12. Vertical core box 16 is adapted to accommodate the conductors of the aerial cable. These conductors are suitably brought into the vertical core box 16 from horizontal core box 11. The conductors leading out of the underground cable and into the core box 12 extend upwardly into the vertical core box 17.

Where more than a single pair of vertical core boxes 16 and 17 are employed in a pole house, we find the use of horizontal core boxes 11 and 12 particularly advantageous, because these boxes furnish convenient means to run groups of conductors, each representing a certain number of circuits, from the aerial and underground cables into the proper vertical core boxes, without exposing them. In other words, the conductors are suitably protected and are kept separated from the jumper wires and cross connecting wires which we shall later describe. Angle irons 20 are furnished to connect the lower ends of vertical core boxes 16 and 17 to horizontal core boxes 11 and 12, but it will be here noted that the front core boxes 11 and 16 are insulated from rear core boxes 12 and 17. Similar angle irons 21 connect the upper ends of vertical core boxes to ceiling 2. In each of two opposite sides of core box 17 is mounted a series of hollow connecting posts 22 extending through the sides of the box and insulated therefrom, preferably as shown, each binding post receiving the end of a conductor of the underground cable. Suitable spring clips in the form of angle irons are electrically connected to binding posts 22, the outer end of these spring clips each having a fuse seat formed therein to receive a fuse 26. Fuses 26 connect across the sides of core boxes 16 and 17, in bridging relation, while the opposite ends of these fuses connect in similar spring clips 27 carried by a series of vertical binding posts 28. Binding posts 28 are suitably insulated from aerial core box 16 by means of insulation washers 29. The binding posts 28 may be arranged in a vertical row along the front edges of aerial core box 16, preferably along both edges, however, to receive the adjacent terminals of fuses 26. Another series of horizontally disposed pairs of similar binding posts 30 and 31 may be furnished adjacent the vertical binding posts 28 for the purpose, of course, of connecting the aerial conductors with the underground conductors through the fuses 26. It will be noted in Fig. 1 that short jumper wires 32 and 33 are provided for this purpose, each side of the line having a separate fuse and connecting to one terminal of each series. It is apparent, however, that only one side of each circuit may be fused, if so desired.

Core boxes 16 and 17 are provided with cover plates 34 and 35, respectively. Core box 17 has its edges bent at right angles as indicated at 36 in Fig. 4 to secure the cover 35 to the box portion to close the latter and thereby form an airtight and moisture tight box for the underground cable to enter. The joint between the flanges 36 and the cover 35 may be kept air and moisture tight by means of a gasket 37 preferably of rubber interposed between the parts 35 and 36, screws being employed, however, as the fastening elements. Core box 16 has its edges folded back preferably to stiffen the same and then bent into vertical flanges 38 to receive screws 39, which secure cover plate 34 in position. A rubber gasket 40 may be used to form an airtight and moisture tight closure for said core box 16. It will be noted that we prefer to arrange both series or sets of terminals on cover plate 34. Cover plate 34 is slightly larger crosswise than cover plate 35, so as to accommodate the vertical binding posts 28 between the sides of the core boxes and the fuse clips. We find it advantageous to have such an arrangement and to provide a fanning strip 43 centrally between these binding posts to receive twisted pairs of conductors 44 to obtain cross connections between different circuits where changes in service may be desired and where it may be necessary to make such cross connections occasionally, due to certain lines getting out of order. The fanning strip 43 further serves to bunch the cross connecting wires in close relation in the front of each unit by carrying a plurality of vertically aligned rings 45 through which these cross connecting wires pass. It will be noted in Fig. 1 that any number of these cross connecting wires may be employed to furnish connections between circuits anywhere along the front of the aerial core box 16, and, if necessary, these cross connecting wires may be run upwardly to the top of each unit and be led across to another unit for connection to conductors accommodated therein. Front cover 34 of aerial core box 16 acts as a terminal carrying plate, which compactly arranges the circuit connections for the circuits leading into each unit. Thus, possibility of confusion or improper connections may be reduced to a minimum, while the testing of these lines is accordingly simplified. Disposing terminals 30 and 31 in horizontal pairs allows the jumper wires and cross connecting wires to be conveniently led therebetween from the vertical terminals 28 to the center fanning strip 43. Fanning strip 43 is secured to the front plate 34 by means of bolts 48. It is usually customary to furnish this fanning strip with a plurality of transverse openings 49, indicated in dotted lines in Fig. 4.

It will readily be seen that the construction above described provides a very light cable terminal and a cable terminal which is very strong and readily accessible, conveniently tested and repaired or in which circuit changes may be quickly made. The usual mass of cross wires forming an undesirable network in front of the core boxes by the usual number of cross connections employed in a cable terminal has been eliminated, and consequently, circuit connections may be quickly traced.

We do not wish to limit this invention to all the particular details of construction as herein shown and described as many modifications may be made without departing from the scope of the appended claims.

We claim:

1. A cable terminal comprising a pole house adapted to be suitably secured in position with a plurality of vertically disposed core boxes therein, said core boxes being arranged in units of at least two each for interconnecting electrically underground conductors and aerial conductors accommodated within said core boxes, protective devices disposed along the sides of said core boxes for permitting the connection of said underground conductors to said aerial conductors, and horizontally disposed core boxes below said vertical core boxes and into which the underground and aerial conductors are led from the exterior of the terminal.

2. A cable terminal comprising a pole house adapted to receive one or more pair of core boxes vertically disposed therein, protective devices for each pair serving to interconnect the underground conductors accommodated in one of the core boxes of each pair to the aerial conductors accommodated in the other core box of the same pair, and horizontally disposed core boxes provided for common connection with the core boxes of said vertical pairs and arranged one for the vertical core boxes accommodating said underground conductors and one for the vertical core boxes accommodating said aerial conductors.

3. A cable terminal comprising a pole house adapted to have one or more pairs of core boxes arranged in a vertical position therein, protective devices serving to connect underground conductors accommodated in one of said core boxes of each pair to aerial conductors accommodated in the other core box of the same pair and to arrange each pair as a separate unit in said pole house, a horizontally disposed core box for receiving said underground conductors, a second horizontally disposed core box for receiving said aerial conductors, each horizontally disposed core box separately connecting and supporting the vertically disposed core box of each pair which receive conductors therefrom, and insulated top and bottom mountings for said core boxes whereby said core boxes receiving said underground conductors are electrically insulated from said core boxes receiving said aerial conductors.

4. A cable terminal comprising a pole house adapted to be suitably secured in position and provided with a plurality of core boxes vertically disposed therein, said core boxes being arranged in units of at least two each, which units may be separated from one another within said pole house, protective devices disposed along the sides of said core boxes for permitting the connection of underground conductors accommodated in one of the core boxes of each unit to aerial conductors accommodated in the other core box of the same unit, studs on the sides of said boxes for receiving said protective devices, terminal connectors for accommodating electrical connections along the front core box of each unit, and a fanning strip disposed substantially lengthwise and centrally along said front core box and between said terminal connectors whereby cross connections between circuits connected to the same unit or to different units may be conveniently made and with the interconnecting conductors running centrally along each unit at said fanning strip.

5. A cable terminal comprising a pole house adapted for the reception of a plurality of core boxes vertically disposed therein, said core boxes being provided in pairs, each pair individually accommodating the underground and aerial conductors of said terminal, protective means on the exterior of said core boxes for permitting the connection of said conductors together, terminal conductors accessibly disposed along the front face of one of said core boxes, said terminal connectors accommodating interconnecting jumper wires permitting electrical connection between the underground conductors and the aerial conductors of a single circuit leading into a single pair of said core boxes and to interchangeably accommodate interconnecting wires between said conductors of different circuits of the same pair, and a fanning strip arranging said interconnecting wires in a substantially bunched or close relation along the center of said front face of said core box.

6. A cable terminal comprising a pole house adapted for the reception of a plurality of core boxes disposed one in front of the other to form pairs which are arranged in parallel relation in said pole house, protective means accessibly disposed on the sides of said core boxes to permit interconnection of the conductors accommodated therein, a plurality of binding posts disposed in a vertical plane along the front edges of one of said core boxes and additional binding posts arranged in horizontal pairs adjacent to said vertically disposed binding posts permitting connection therewith to connect said protective devices to the conductors of the same circuit leading into said core boxes of each pair, and to cross connect said protective devices to conductors of different circuits leading into the same pair of core boxes or into different pairs of core boxes.

7. A cable terminal comprising a pole house adapted to have one or more pairs of core boxes arranged in a vertical position therein, the core boxes of each pair being disposed one in front of the other, means for leading protected underground conductors and unprotected aerial conductors separately into said core boxes of each pair, protective devices accessibly disposed at the sides of said core boxes, a plurality of binding posts arranged in vertical rows along the edges of the front face of one of said core boxes and also in horizontal pairs adjacent to said vertical rows, interconnecting conductors connected between said protected underground conductors and said unprotected aerial conductors of the same circuits or for cross connection between these conductors of different circuits, and fanning strips arranged vertically between said binding posts for grouping said interconnecting conductors centrally in front of each pair and to permit cross connection at the ends of said fanning strips to adjacent pairs of said core boxes.

8. A cable terminal comprising a pole house adapted to have one or more pairs of sheet metal core boxes vertically mounted therein, protective devices accessibly disposed in said pole house at the sides of said core boxes for permitting the connection of underground conductors and aerial conductors accommodated in said core boxes, terminal connectors along the front edges of one of said core boxes, said terminal connectors being so arranged as to permit interconnections between the underground conductors and aerial conductors of the same circuits or to permit cross connection between these conductors of different circuits, and a fanning strip for each pair of said core boxes, said fanning strips having ring-like members thereon to receive said cross connections and to group the same centrally in front of each pair and to lead the same at the top or bottom to cross connections of other pairs.

9. A cable terminal comprising a pole house and a plurality of core boxes disposed therein one in front of the other, protective means mechanically arranging said core boxes in pairs within said pole house, said protective means being disposed at the sides of said core boxes, one of said core boxes having aerial conductors therein electrically connecting through said protective means with underground conductors in the other box of each pair, and terminals mounted on the front face of one of said boxes, said terminals being arranged both for jumper wires between terminals in the same circuit or for interconnecting wires between terminals of other circuits.

10. A cable terminal having front and rear core boxes, and protective devices accessibly disposed on the sides thereof whereby to provide protected connections between conductors accommodated in said core boxes, said protected connections including a plurality of binding posts and a plate on the front core box for carrying said binding posts, said plate being removably mounted to facilitate the connection of certain of said binding posts with the conductors in said front core box.

11. A cable terminal having two core boxes arranged as a pair and protective devices accessibly disposed on the sides thereof for providing protected connections between conductors accommodated in said core boxes, said protected connections including a plurality of binding posts on said core boxes, and removable front plates on said core boxes permitting access to the interior thereof whereby to facilitate the attachment of the conductors within to said binding posts.

12. A cable terminal having two core boxes arranged as a pair and protective devices disposed on the sides thereof whereby to provide protected connections between conductors accommodated in said core boxes, one of said core boxes having a front plate provided with marginal flanges protruding beyond the sides of the core box, binding posts carried on said front plate along said marginal flanges for connection with said protective devices, and other binding posts on said front plate extending therethrough into the interior of the core box to provide connections between the conductors therein and said binding posts along said marginal flanges.

In witness whereof, we have hereunto subscribed our names.

GEORGE R. FOLDS.
LAWRENCE M. PERSONS.

CERTIFICATE OF CORRECTION.

Patent No. 1,697,060.   Granted January 1, 1929, to

GEORGE R. FOLDS ET AL.

It is hereby certified that error appears in the printed specification of the above numbered patent requiring correction as follows: Page 3, line 59, claim 1, strike out the word "for"; page 4, lines 4 and 5, claim 5, for the word "conductors" read "connectors"; and that the said Letters Patent should be read with these corrections therein that the same may conform to the record of the case in the Patent Office.

Signed and sealed this 19th day of February, A. D. 1929.

(Seal)

M. J. Moore,
Acting Commissioner of Patents.